(No Model.) 2 Sheets—Sheet 1.

W. M. OUNGST.

MOVABLE ARTIFICIAL BORDER FOR FLOWER BEDS, GARDEN PATHS, &c.

No. 352,146. Patented Nov. 9, 1886.

Witnesses:
C. D. Harsin
R. H. Orwig

Inventor:
Webb M. Oungst,
By Thomas G. Orwig, Atty.

(No Model.) 2 Sheets—Sheet 2.
W. M. OUNGST.
MOVABLE ARTIFICIAL BORDER FOR FLOWER BEDS, GARDEN PATHS, &c.
No. 352,146. Patented Nov. 9, 1886.
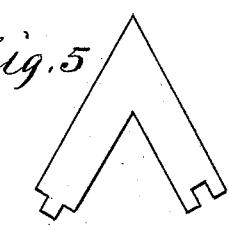
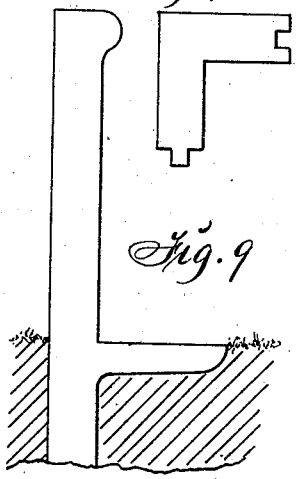
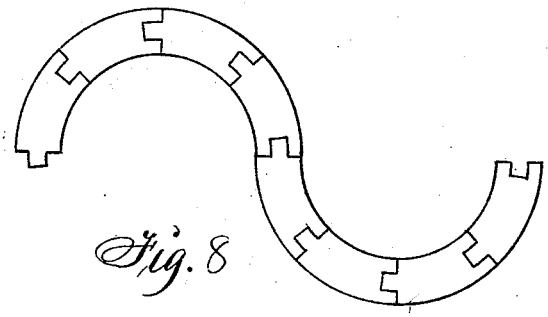
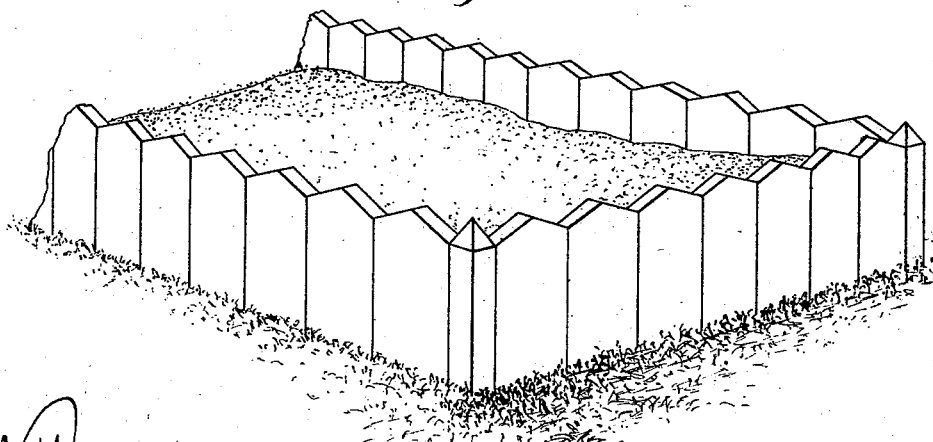

UNITED STATES PATENT OFFICE.

WEBB M. OUNGST, OF HARLAN, IOWA.

MOVABLE ARTIFICIAL BORDER FOR FLOWER-BEDS, GARDEN-PATHS, &c.

SPECIFICATION forming part of Letters Patent No. 352,146, dated November 9, 1886.

Application filed May 24, 1886. Serial No. 203,148. (No model.)

*To all whom it may concern:*

Be it known that I, WEBB M. OUNGST, a citizen of the United States of America, and a resident of Harlan, in the county of Shelby and State of Iowa, have invented a new and useful Movable and Transformable Border for Flower-Beds, of which the following is a specification.

My object is to encourage and facilitate the application of ornamental borders around flower-beds, garden-walks, &c.; and my invention consists in the construction and combination of complete corner-pieces and complete border-sections, as hereinafter described and claimed, in such a manner that a person of ordinary taste and skill can readily place them in position as required to produce fixed borders of various artistic designs that will separate and protect flower-beds on lawns from grass, prevent loose soil from falling upon walks in yards and gardens, and afford much pleasure and satisfaction to all who can appreciate the beautiful in homes, parks, and cemeteries.

Figure 1:
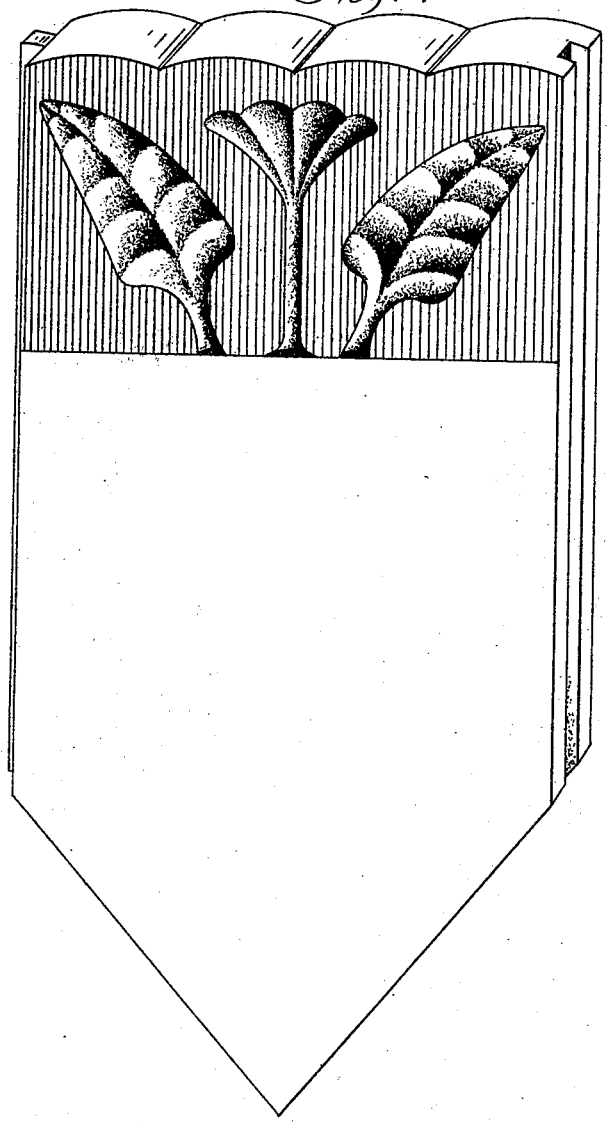
Figure 2:
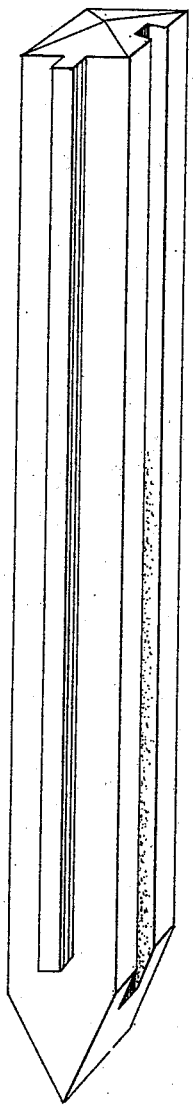
Figure 3:
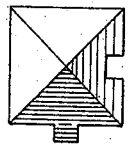

Figure 1 of the accompanying drawings is a perspective view of one of my border-sections that is a finished article of manufacture and merchandise. It is about ten inches long, five inches wide, and one inch thick, pointed at its lower and plain-faced end, and provided with a tongue on one of its straight vertical edges and a groove in the opposite and parallel edge. The top edge may be plain or of ornamental shape, and the top portion of the body of the section embellished with ornamental figures in relief or in open forms, of any artistic design desired. It is preferably made of clay (terra-cotta) by means of molds or dies, or of cast metal, and painted any color that may be fancied. Fig. 2 is a perspective view, and Fig. 3 a top view, of a post or corner-piece having a tongue on one of its sides and a groove on the other, adapting it to be connected with my border-sections. Fig. 4 is a transverse section of a triangular-shaped corner-piece having a tongue and also a parallel groove in one of its sides to adapt it to be connected with border-sections, as indicated by dotted lines, to produce a corner in a star-shaped border. Fig. 5 shows a modification of Fig. 4. Fig. 6 represents a corner-piece adapted for making a border of heptagon form, and Fig. 7 for making right-angled corners in borders of various shapes. Fig. 8 shows curved sections adapted for making circular, curved, or serpentine borders. Fig. 9 represents a section having a flange extending horizontally outward from its central portion for the purpose of aiding in retaining the border firm in its place, to prevent grass from growing close to the vertical surface of the border, and also to facilitate the cutting of grass neatly with a lawn-mower at the side of the border. Fig. 10 is a perspective view of a complete border around a flower-bed.

All the various forms and modifications of corner-pieces and border-sections can be readily made of clay or metal any size desired, and readily combined to produce complete, durable, and ornamental borders of various designs to accomplish the results contemplated by my invention. All the material thus used to construct a border can be readily lifted and removed, to be used in a different place when desired.

I am aware that metal plates having fastening devices on their ends and flanges at their bottoms and sides to aid in retaining them connected and perpendicular have been used for curbing along the edges of walks; but my manner of forming corner-pieces and border-sections pointed at their lower ends and providing them with tongues and grooves, so that they can be readily connected and set in the ground by hand to produce a complete, durable, ornamental, and removable border, is novel and greatly advantageous.

I am aware that border-sections have been made of clay and metal and joined together in various ways to produce complete borders; but my manner of forming tongued and grooved corner-pieces and detachable sections with pointed bottom ends, so that they could be separately handled and readily combined by setting each piece in place and pressing it in the ground to produce complete removable and transformable borders, is novel and advantageous.

I claim as my invention—

1. As a new article of manufacture, a corner-piece for borders, composed of clay or metal, pointed at its lower end, and provided with a tongue and a groove that extend vertically and parallel, substantially as shown and described, for the purposes stated.

2. A border-section consisting of a plate made of clay or metal, pointed at its lower end, and provided with a tongue on one of its vertical edges and a corresponding groove in its opposite and parallel edge, for the purposes stated.

3. In a border for flower-beds, &c., the combination of a corner-piece having a pointed bottom and a vertical tongue, and a groove extending parallel with the tongue, and two movable border-sections, each pointed at its lower end, and provided with a tongue on one of its vertical edges and a groove in its other parallel edge, substantially as shown and described, for the purposes stated.

WEBB M. OUNGST.

Witnesses:
E. A. REYNOLDS,
JOHN ROBINSON.